May 27, 1924.

C. H. TOMLINSON

CAR COUPLER

Filed June 30, 1919      6 Sheets-Sheet 1

Inventor
Charles H. Tomlinson
By Brown & Nissen.
Attorneys

May 27, 1924. 1,495,463
C. H. TOMLINSON
CAR COUPLER
Filed June 30, 1919   6 Sheets-Sheet 3

Inventor
Charles H. Tomlinson
By Brown & Nissen
Attorneys

Patented May 27, 1924.

1,495,463

UNITED STATES PATENT OFFICE.

CHARLES H. TOMLINSON, OF MANSFIELD, OHIO, ASSIGNOR TO THE TOMLINSON COUPLER COMPANY, OF MANSFIELD, OHIO, A CORPORATION OF OHIO.

CAR COUPLER.

Application filed June 30, 1919. Serial No. 307,539.

*To all whom it may concern:*

Be it known that I, CHARLES H. TOMLINSON, a citizen of the United States, residing at Mansfield, in the county of Richland and State of Ohio, have invented certain new and useful Improvements in Car Couplers, of which the following is a specification.

This invention has for its object the provision of a device of the class named which shall be of improved construction and operation.

The invention is exemplified in the combination and arrangement of the parts shown in the accompanying drawings and described in the following specification, and it is more particularly pointed out in the appended claims.

Figure 5:
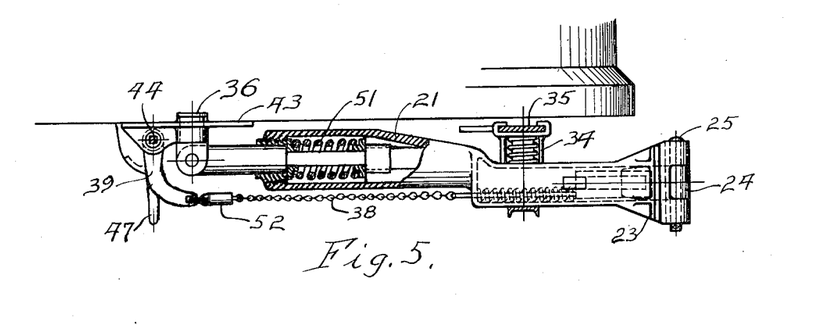
Fig. 5 is an elevation of a coupler in place on a car.
Figure 13:
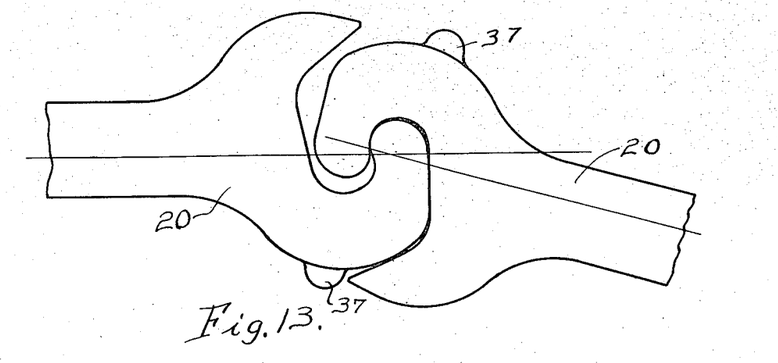
Fig. 13 is a diagrammatic view showing the limiting angular position of two couplers as commonly applied in steam railway practice.
Figure 15:
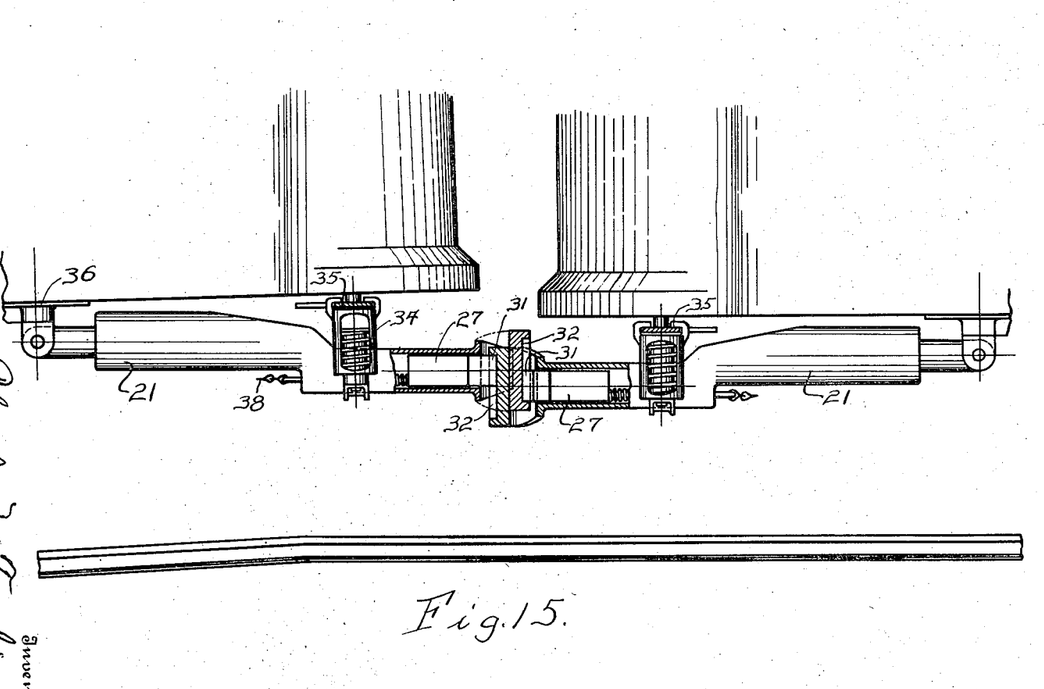
Fig. 15 is an elevation of portions of two cars coupled together as the cars pass over the top of an elevation.

A coupling device to meet the requirements of modern electric railway practice not only must be so designed that it will properly operate when two cars of an electric railway are connected together with counterpart couplers, but it must also be able to properly operate when connected with a coupler of the usual form used on steam railways, for the reason that it is frequently desirable to couple a car from a steam railway to a car of an electric railway. In steam railway practice there are are no short curves and no sudden changes in grade and it is customary to connect the couplers rigidly with the ends of the cars and provide for sufficient pivotal movement between the couplers themselves to accommodate the cars as they pass around the curves of the steam road. In Fig. 13 there is represented diagrammatically a pair of couplers 20 such as are commonly used on steam roads. The pivotal joint for the connecting knuckles of the couplers is not shown, but the drawings illustrate the angular movement between the couplers since the knuckles are held rigidly with the head of the coupler when two cars are connected together so that the angular movement is the same as if the entire coupler heads were made in one piece. It will be seen that the coupler at the right of the figure is swung to the limit of its angular movement, which illustrates the extreme angular movement in steam railway practice, the amount of movement being about 16° on either side of the center line. In electric railway practice much shorter curves are encountered and it is impractical to depend upon pivotal movement between the coupler heads to accommodate such curves. It is therefore common to provide electric railway cars with elongated drawbars such as shown at 21 in Fig. 5. These drawbars are usually approximately five feet long and are pivoted to the car at a point spaced from the end thereof, as shown in Figs. 5 and 15. When two sets of drawbars are connected together by the coupler head it will be seen that the two cars are joined by a bar, the combined length of which is ten feet and the ends of which are pivoted to the two cars at points spaced inwardly from the ends of the cars. This arrangement as will be readily seen will permit of much shorter turns than that common in steam railway practice. Where pivoted drawbars are used it is necessary, however, that the heads when coupled together shall form a rigid connection so far as lateral movement is concerned, for the reason that if the coupler heads were pivotally connected together, the bars would buckle at the pivotal connection between the coupler heads whenever a pushing force was exerted between the two cars. It is therefore apparent that an electric coupler must be so designed that it will permit of pivotal movement when connected with a steam railway car, but will be locked rigidly against such pivotal movement when connected with a counterpart coupler of its own type.

In electric railway coupling practice it is also necessary to provide for a much greater vertical movement of the two coupler heads relative to one another than is required in steam railway practice, for the reason that much sharper breaks in the grade of the track are permitted in electric railway practice than in steam practice. Fig. 15 shows a pair of couplers constructed according to the present invention and connected with two cars passing over the high point in an elevation of the track. If two couplers were permitted unlimited vertical movement relative to one another they would frequently be disconnected vertically under conditions like that illustrated in Fig. 15. The various features of applicant's invention for meeting the requirements referred to and others will appear in connection with the description of the invention.

Figure 1:
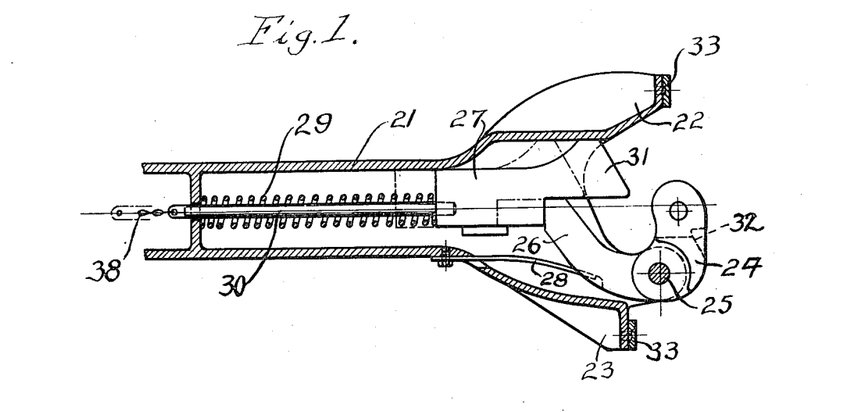
Fig. 1 is a horizontal sectional view of a car coupler forming a part of the present invention.
Figure 2:
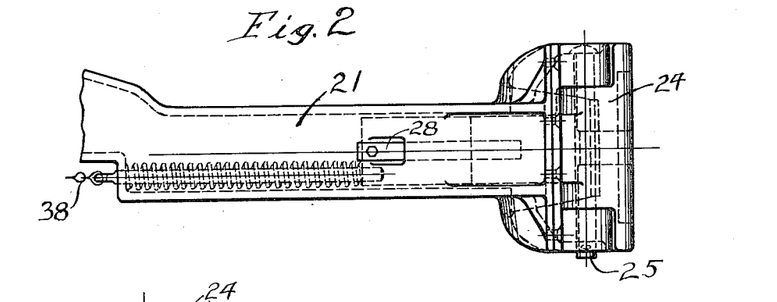
Fig. 2 is an elevation of the coupler shown in Fig. 1.
Figure 4:
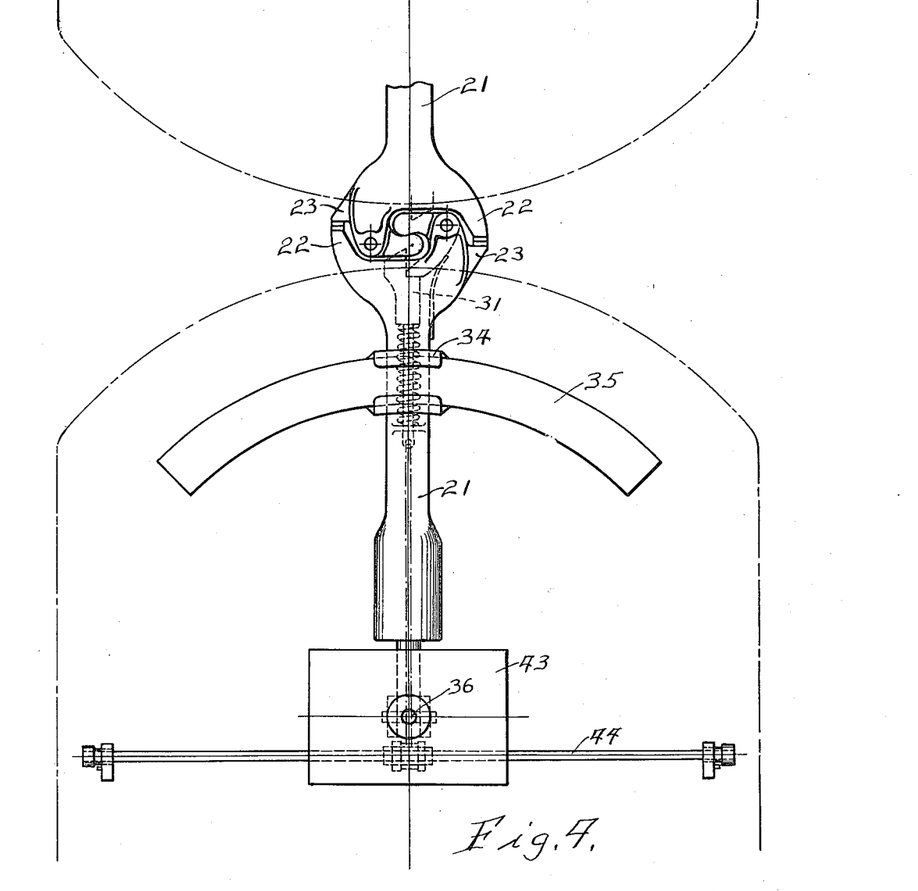
Fig. 4 is a top plan view of a coupler and its operating mechanism shown in engagement with a counterpart coupler.

It will be seen from Fig. 1 of the drawings that the drawbar 21 comprises a hollow casting provided at one side with a guard arm 22 and at the other side with an abutment shoulder 23. A coupling knuckle 24 is pivoted at 25 at the side of the center line of the coupler head adjacent the shoulder 23. The knuckle 24 is provided with a tailpiece 26 for contacting with the sliding lock 27 on which the knuckle is held in coupling position. A spring 28 normally swings the knuckle into open or uncoupled position so that when two cars are brought together the front ends of the knuckle will pass one another and strike the tailpieces of the knuckles of the cooperating coupler and be swung into coupling position shown in Fig. 4. When in this position the sliding lock 27 is moved forwardly, as shown in Figs. 1 and 4, by a spring 29 coiled about a rod 30 connected with the rear of the sliding lock. The lock 27 is provided at its forward end with a nosepiece 31 for engaging a notch 32 on the knuckle of the cooperating coupler, as illustrated in Fig. 4. When two coupler heads are thus connected together the knuckles are doubly locked having their tailpieces held by the lock of the same coupler head and having the notches 32 engaged by the nosepiece 31 of the lock of the cooperating coupler head. At the same time the front end of the guard arm 22 of each coupler head engages the shoulder 23 of the cooperating coupler head so that the coupler heads are held against pivotal movement relative to one another. The contacting surfaces of the guard arms and shoulders 22 and 23 are preferably provided with wear plates 33.

Figure 3:
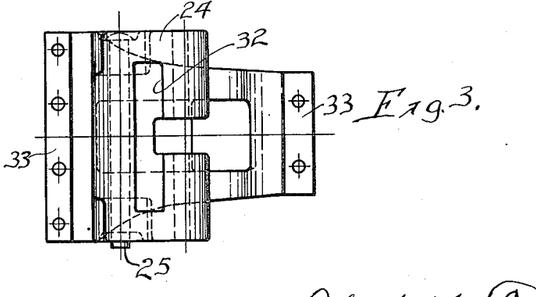
Fig. 3 is an end view of the coupler looking from the right in Fig. 2.

It will be noted from Figs. 3 and 15 that the openings 32 are longer vertically than the height of the nosepiece 31 of the sliding catch 27, but that the top and bottom of the openings 32 are closed to limit vertical movement of the catch in the slot. This will prevent the coupling heads from being disconnected by vertical movement relative to one another and yet will allow the coupling of two cars although their coupler heads are slightly out of horizontal alinement due to inequality of load on the cars or other causes. Where the relative vertical movement of two coupler heads is limited it is apparent that some provision must be made for vertical movement of the cars relative to one another to a greater extent than that permitted of the relative movement of the coupler heads and this is done in the present invention by providing spring drawbar carriers shown at 34 which normally hold the drawbars and coupling heads in an intermediate position, but permit resilient vertical movement of the drawbars on both sides of normal position. The spring drawbar carriers are mounted to slide on arcuate supports 35 suspended from the car bodies and curved about the pivots 36 on which the ends of the drawbars are supported. In Fig. 15 the cars are shown displaced vertically a distance greater than that permitted by the movement of the sliding catches 27 in their notches 32. When the coupling heads have moved vertically relative to one another the maximum amount permitted by the notches 32 further relative vertical movement of the cars is accommodated by the spring action of the drawbar carriers 34. It will thus be seen that the spring catches hold the coupler heads from disconnection vertically and that the abutment members 22 and 23 prevent buckling of the drawbars under compression, so that together the two features adapt the coupler heads to the peculiar conditions of electric railway practice. When, however, a coupler head made according to the present invention is caused to engage a coupler head of the form commonly used in steam railway practice, the spring catch 31 will be moved to a partially withdrawn position illustrated in broken lines in Fig. 1 the contact of the abutments 33 of the cooperating couplers will swing the couplers about their pivotal supports until alignment is secured. If the abutments were not present the nose-pieces 31 of the locking bars 27 would not register with the openings 32 of the cooperating couplers if the couplers happened to be swung slightly to one side or the other of the center line. Any such angular displacement is corrected by the abutment members 33, which will restore the angular position of the couplers and bring them into alignment so that the nose-pieces 31 will enter the openings 32 and thus bring these parts into cooperation so as to prevent uncoupling by relative vertical displacement.

I claim:—

1. In a car coupler, the combination of a drawbar universally pivoted at one end, supporting means for the other end of said drawbar permitting vertical and lateral movement thereof, a hollow coupler head carried by said drawbar and having a pivoted knuckle provided with an elongated slot, a spring-held locking bar adapted to engage said knuckle to hold it in locked position, said locking bar being adapted to engage also the recess of the knuckle of an opposing coupler to limit vertical displacement when in coupled relation with said opposing coupler, said first-mentioned coupler having a guard arm on one side and a shelf on the other side of the center line thereof arranged to engage with a corresponding guard arm and shelf of said opposing coupler when in coupled relation therewith said guard arms and shelves operating automatically on impact of the cars to bring the locking bars of each coupler into alinement with the recess of the knuckle of the cooperating coupler and to retain the drawbars of said couplers in longitudinal alinement, and unlocking means operable from either side of the car intersecting the center of motion of said drawbar whereby the movement of the locking bar is the same at any position of the drawbar.

2. In combination, a car coupler provided with an extended arm on one side of the center line thereof arranged to guide said coupler into engagement with a cooperating coupler, an abutment on the opposite side of said coupler head for engaging the guard arm on said cooperating coupler, a pivoted knuckle with an elongated recess in the face thereof, a sliding spring-held locking bar adapted to engage the elongated recess of a cooperating knuckle, said locking bar being arranged also to limit vertical displacement of said coupler relative to said cooperating coupler while said guard arm and abutment are arranged to aline said couplers automatically on impact of the cars for entrance of said locking bar into the recess in said knuckle and to maintain the drawbars of said couplers in longitudinal alinement when in coupled relation, and uncoupling means accessible from either side of the car and operable irrespective of the lateral or vertical movement of the draw bar.

3. In combination, a car coupler having means thereon for locking said coupler in engagement with a cooperating coupler, said locking means being formed to cooperate with the locking means of the cooperating coupler to prevent disengagement of said couplers by vertical displacement relative to one another, and abutment members on opposite sides of the center line of said coupler arranged to be held in abutting relation with corresponding members of said cooperating coupler by the locking means of said couplers to hold said couplers in longitudinal alinement with one another, the abutting members of the two couplers cooperating on impact of said couplers to position said locking means for locking engagement.

4. Mechanism for coupling a pair of cars together comprising drawbars pivotally connected with said cars and having coupling heads carried thereby at the ends thereof opposite said pivotal connections and cooperating with one another to hold said cars in coupled relation, draft knuckles pivoted on said coupler heads for engagement with one another, means for holding said draft knuckles in coupling engagement, means for preventing disengagement of said coupler heads by vertical displacement relative to one another while permitting a limited amount of vertical displacement of said coupler heads, and abutment members on each of said coupler heads and spaced laterally from the center lines thereof for engaging the corresponding abutment members of the cooperating coupler head to prevent lateral buckling of said drawbars when said drawbars are subjected to a pushing stress and to bring said drawbars into alinement on impact of said coupler heads to permit proper engagement of the cooperating parts carried thereby.

Figure 14:
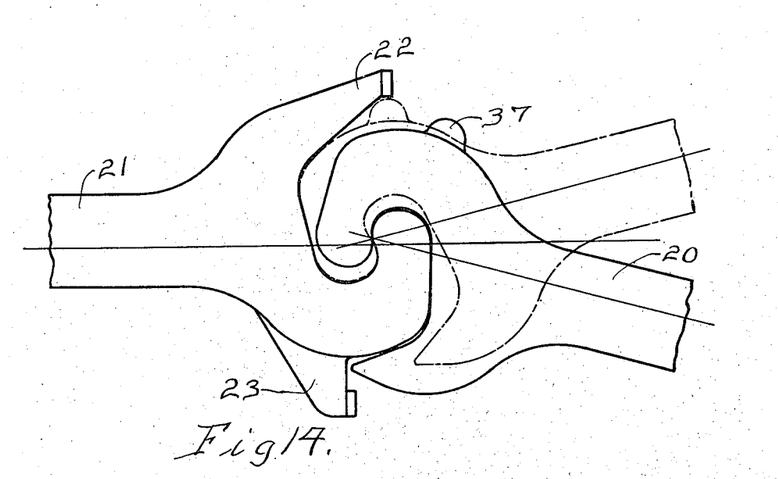
Fig. 14 is a diagrammatic view showing a coupler made in accordance with the present invention connected with a coupler of well-known type used in steam railway practice and the figure illustrates the angular movement between the two couplers.

5. Mechanism for coupling a pair of cars together comprising a drawbar pivotally connected to each of said cars and having a coupler head thereon at the end thereof opposite said pivotal connection, a coupling knuckle pivotally mounted on each of said heads, a lock on each of said heads for holding the knuckle thereon in engagement with the knuckle of the cooperating head, said lock having means thereon for engaging the knuckle of the cooperating head to lock said knuckle against pivotal movement and to limit vertical movement of said heads relative to one another, yielding drawbar carriers for permitting vertical movement of and will be held in this position by contact with the knuckle of the steam railway coupler head, or else may be locked in this position by mechanism to be described so that pivotal movement with the coupler of the steam railway car is not interfered with by the lock which holds a pair of counterpart electric railway couplers rigidly relative to one another. This pivotal movement of two unlike couplers is illustrated in Fig. 14 and it should be noted that the guard arm 22 is spaced outwardly a sufficient distance to accommodate a projection 37 usually found on couplers of the steam railway type. It is also noted that the shoulder 23 is spaced backwardly from the end of the coupler a sufficient distance to permit pivotal movement of the two couplers relative to one another without interfering with the guard arm of the steam railway car coupler.

Figure 6:
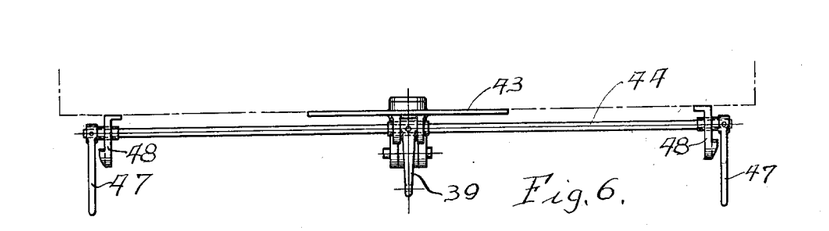
Fig. 6 is an elevation of the coupler-operating mechanism.
Figure 7:
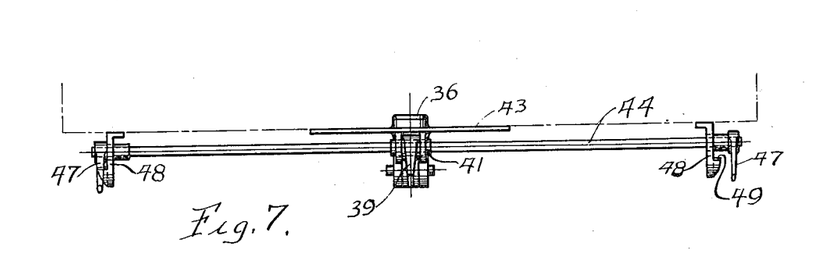
Fig. 7 is a view similar to Fig. 6 but showing the operating mechanism in a different position.
Figure 8:
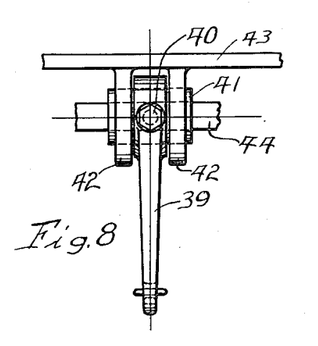
Figs. 8 and 9 are elevations taken at right angles to one another showing the oscillatory arm for operating the coupler.
Figure 9:
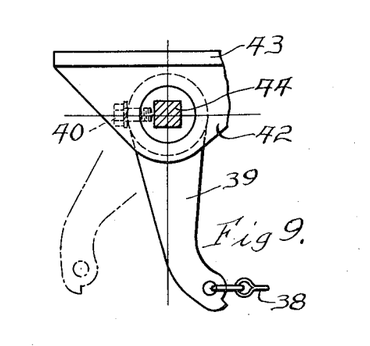
Figure 10:
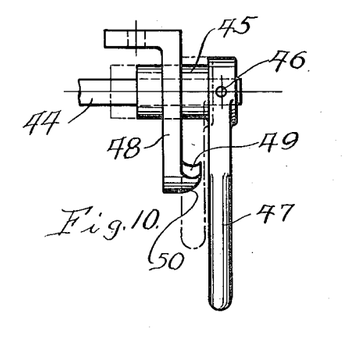
Figs. 10 and 11 are elevations at right angles to one another showing the hand lever for operating the coupler.
Figure 11:
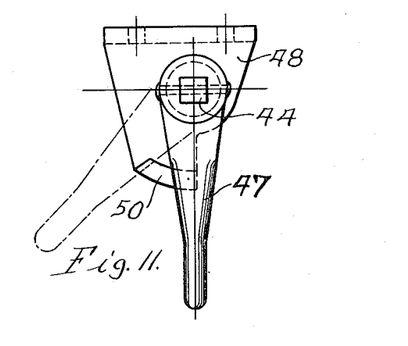

The inner end of the operating rod 30 for the slide lock 37 is provided with an operating chain 38 which extends inwardly to a position directly beneath the pivotal support 36 for the drawbar 21 where it is connected with a downwardly extending arm 39 which is secured by a set screw 40 to a sleeve 41 journaled in bearing lugs 42 extending downwardly from a plate 43 which carries the pivot 36 for the drawbar. The sleeve 41 is provided with a central square opening through which passes a squared shaft 44. The squared shaft 44, as shown in Figs. 6, 7, 10 and 11 is provided at each end with a sleeve 45 rigidly secured thereto by pins 46 and provided with an operating handle 47. The sleeves 45 are journaled in bearing lugs 48 which are secured to and project downwardly from the car floor, as shown in Figs. 6 and 7. Each bearing lug 48 is provided with a catch member 49 having a beveled surface 50 against which the operating lever 47 bears when the lever is swung inwardly or away from the car to retract the sliding lock 27. It will be apparent that the squared shaft 44 may be slid in the direction of its axis transversely of the car and thus may be caused to engage the catch 49 and be held in a retracted position as illustrated in broken lines in Fig. 11. The chain 38 is of such length that when the operating lever 47 engages the catch 49, the sliding lock 27 will be held in partially withdrawn position shown in broken lines in Fig. 1. The sliding lock may be set in this position when the coupler is connected with a coupler of a steam railway car so that the nose 31 of the lock will be prevented from rubbing upon the knuckle of the steam railway car coupler and yet the knuckle of the electric railway car coupler will have its tailpiece 26 held by the sliding lock to hold the two couplers in engagement with one another. In order to release the knuckle 24 the operating lever 47 is further rotated in a clockwise direction, as shown in Figs. 5 and 11, to withdraw the sliding lock 27 from engagement with the tail-piece of the pivoted knuckle 24. When two couplers made according to the present invention are connected it is apparent that both sliding locks must be withdrawn to disconnect the couplers for each lock holds the knuckles of both couplers. The uncoupling operation is performed by first swinging the operating lever 47 of one of the cars to the position shown in broken lines in Fig. 11 and sliding the squared shaft endwise to bring the lever 47 into engagement with the catch 49. This will hold the sliding lock 27 in partially retracted position. The operator then goes to the connected car and swings the operating lever 47 entirely back to completely release the knuckle of the coupler of that car. This will permit uncoupling of the cars for the reason that the notch 32 of the second car has already been released from the nose 31 of the sliding lock 27 first operated. When it is again desired to couple the car in which the lever 47 was first operated with another car, the operator may happen to be on the side of the car opposite that on which the lever 47 is engaged by the catch 49. It is desirable therefore to be able to release the lever 47 from its catch from either side of the car regardless of which side of the car the operator was on when the lever was set in its partially retracted position. This may be accomplished with the present invention for the reason that the squared rod 44 is provided with an operating lever 47 at each end and the rod may be rotated from one end as well as the other and may also be slid longitudinally of its axis from either side of the car to move either lever into and out of engagement with its corresponding catch.

Figure 12:
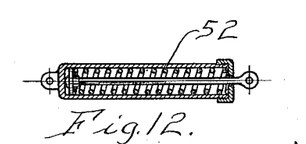
Fig. 12 is a sectional view of a spring and casing which is inserted in the coupler operating chain.

Since the chain 38 is connected to the arm 39 beneath the pivotal center of the drawbar 21 the movement of the drawbar about its pivot will not cause any force to be exerted upon the chain 38 tending to retract the sliding lock 27 or to release the lock if it should be held in partially retracted position. As shown in Fig. 5, however, the drawbar 21 is provided with a spring 51 which permits yielding of the drawbar longitudinally under stresses. It will be apparent that changing of the length of the drawbar under a heavy pull, for instance, would tend to stretch the chain 38, and to accommodate this stretching movement of the chain a spring takeup 52 shown in detail in Fig. 12 is inserted between the links of the chain. This will permit the chain to yield to accommodate itself to variation in the length of the drawbar.

If the two couplers are not in exact alignment when the cars are brought together, said drawbars relative to said cars, and abutment members on each of said heads for engaging the corresponding members on the cooperating head to bring the extremities of said locks into alinement with openings in said knuckles upon impact of said couplers and to hold said drawbars in longitudinal alinement with one another.

6. A car coupler comprising an elongated drawbar pivotally connected with a car, a coupler head carried by said drawbar having a guard arm at one side thereof provided with an abutment shoulder and an abutment member at the opposite side thereof provided with an abutment shoulder for engaging a guard arm of a cooperating coupler head, a coupling knuckle pivotally mounted on said head, means on said head for coacting with a cooperating head to limit vertical displacement of said heads relative to one another, said means being automatically positioned for operative engagement with said cooperating head by said abutment shoulders upon impact of said couplers and means for supporting said drawbar from said car to permit yielding vertical movement of said drawbar relative to said car.

7. Mechanism for coupling a pair of cars together comprising a drawbar pivotally mounted on one of said cars and having a coupler head thereon, coupling mechanism for holding said head in coupled relation with a cooperating coupler head, said mechanism comprising means for preventing said heads from being disconnected from one another by relative vertical movement while permitting a limited vertical displacement of said heads relative to one another, abutment members on said head for engaging said cooperating head to bring said means into operative position and to hold said drawbar in longitudinal alinement with the drawbar of said cooperating head, and means for suspending said drawbar from its car to permit vertical movement of said drawbar relative to said car.

8. Mechanism for coupling one car to another comprising a coupler head having coupling mechanism carried thereby, a lock for said coupling mechanism having a locking, an unlocking, and an intermediate position, and means operable from either side of said car for securing said lock in intermediate position, said means being operable also from either side of said car for releasing said lock from said intermediate position independently of whether said lock was placed in said position from the same or the opposite side of said car.

9. Mechanism for coupling one car with another comprising an elongated drawbar pivotally connected with said car and having a coupler head provided with coupling mechanism, a lock for said coupling mechanism movable into position to lock the coupling mechanism of said coupling head and also the coupling mechanism of a cooperating coupling head, operating means for said lock arranged when in an intermediate position to withdraw said lock from engagement with the coupling mechanism of said cooperating head while retaining the coupling mechanism of said first mentioned head in coupling position, said operating means comprising a catch operable from either side of said car for holding said lock in said intermediate position, and means for releasing said catch from either side of said car independently of whether said catch was set from the same or the opposite side of said car.

10. Mechanism for coupling one car with another comprising a coupler head having coupling mechanism thereon, a lock for said coupling mechanism movable into a locking, an unlocking and an intermediate position, operating means for said lock comprising a shaft extending transversely of said car and rotatable about its axis for operating said lock and also movable in the direction of said axis for locking said shaft in a given position of rotation to hold said lock in intermediate position, and means connected with said shaft on each side of said car for moving said shaft both angularly and longitudinally.

11. In combination, a pair of complementary couplers each connected to a car by a pivotally mounted drawbar, abutments on said couplers for preventing buckling of said drawbars under thrust, and means for retaining said abutments in cooperative relation with one another, said retaining means being arranged to permit a limited amount of movement of said couplers relative to one another in a direction transverse to said drawbars and to prevent disengagement of said couplers due to said relative movement.

In testimony whereof I have signed my name to this specification on this 26 day of June A. D. 1919.

CHARLES H. TOMLINSON.